Patented June 24, 1930

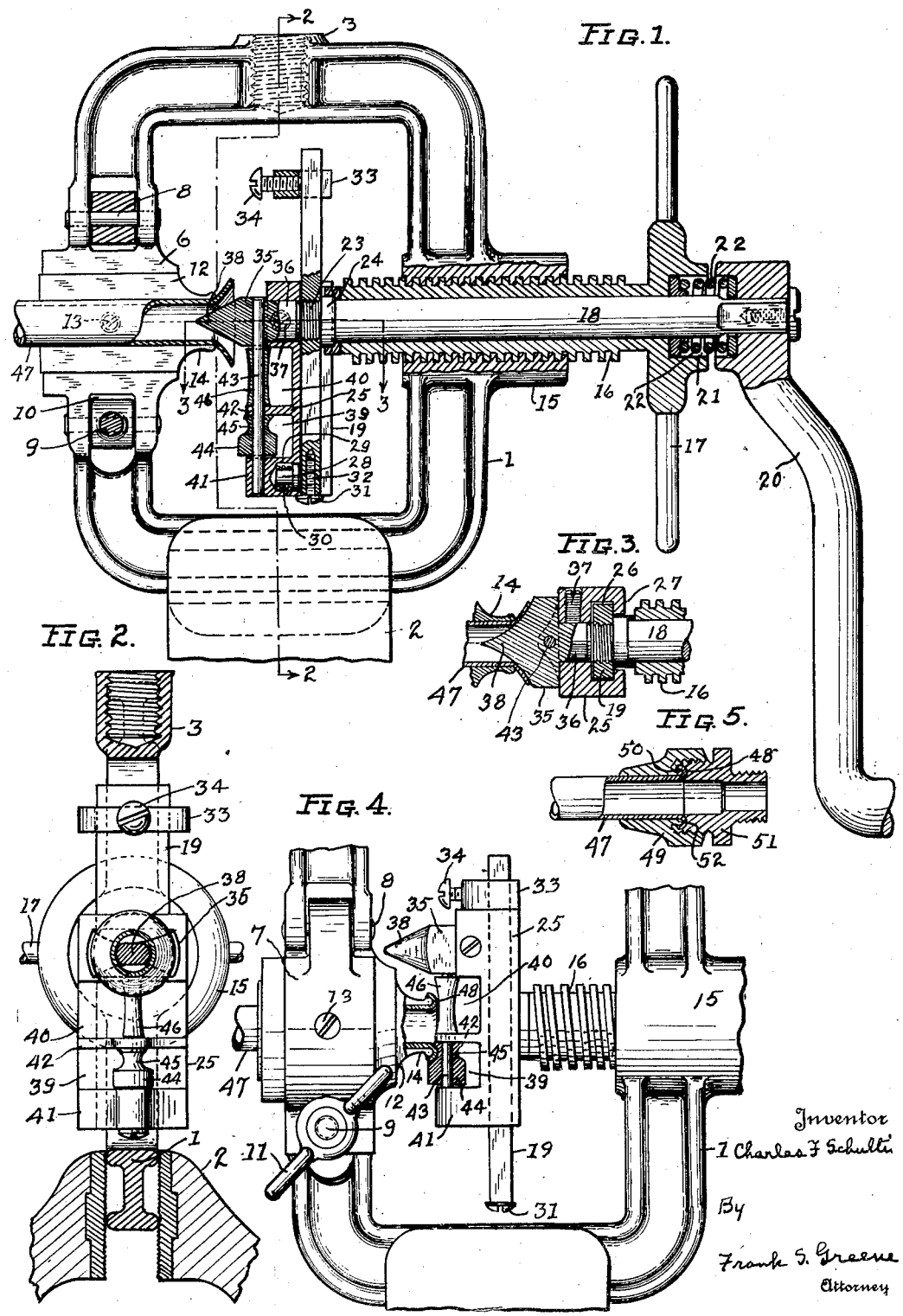

1,765,704

UNITED STATES PATENT OFFICE

CHARLES F. SCHULTIS, OF CLEVELAND, OHIO, ASSIGNOR, BY DIRECT AND MESNE ASSIGNMENTS, OF ONE-FOURTH TO ISADORE HERZBRUN, OF CLEVELAND, OHIO, AND ONE-FOURTH TO S. W. GOLDMAN, OF CLEVELAND, OHIO

PIPE-FLANGING MACHINE

Application filed December 29, 1927. Serial No. 243,240.

This invention relates to a pipe flanging machine for rolling reversely curved hook flanges on the ends of pieces of seamless tubing and is an improvement upon the machine disclosed in my copending application Serial No. 211,718, filed August 9, 1927.

The main objects of the present invention are to simplify the flanging mechanism and to provide flanging devices which operate more effectively upon the smaller sizes of tubing.

With the objects above mentioned in view and others which will appear as the description proceeds, the invention may be said to comprise the devices as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which:

Figure 1 is a side elevation of the machine with the tool head and spindle supporting sleeve shown in section.

Fig. 2 is a section taken on the line indicated at 2—2 in Fig. 1.

Fig. 3 is a section taken on the line indicated at 3—3 in Fig. 1.

Fig. 4 is a fragmentary side elevation showing the head in the position which it occupies at the completion of the flanging operation.

Fig. 5 is a sectional view showing a coupling in which the flanged tubing is used.

As shown in the accompanying drawing, the machine is provided with a rectangular frame 1 in the form of a continuous bar which may be clamped in a vise 2. The frame is provided on one side with a boss 3 which is tapped and threaded so that it may be screwed onto a threaded supporting member such as a bench clamp or other member secured to a work bench, the frame being reversible so that it may be supported either by the vise or by means of the boss 3. On one side thereof, the frame 1 is provided with a device for clamping a piece of tubing to be flanged and this clamping device comprises a semi-cylindrical recess 6 formed in the frame 1 and a pivoted clamping member 7 connected to the frame 1 by a hinge 8 and having a semi-cylindrical recess complemental to the recess 6. The frame 1 carries a pivoted bolt 9 beneath the recess 6 and this bolt engages in the slot 10 in the lower end of the hinged clamping member 7, a wing 11 being provided on the bolt by which the member 7 may be securely fastened in clamping position. Within the cylindrical opening formed between the frame member and the clamping member 7, there is secured a two part bushing 12, each semi-cylindrical section of which is secured to one of the clamping members by means of a screw 13. The bushing 12 has a diameter corresponding to the external diameter of the tube to be flanged and at its inner end has a projecting rounded rib 14. On the side directly opposite the tube clamp, the frame 1 is provided with an internally threaded boss 15 which receives an externally threaded sleeve 16 which has a handwheel 17 fixed to its outer end. The boss 15 is coaxial with the tube receiving bushing 12 and the sleeve 16 has a spindle 18 extending therethrough and rotatable therein. To the inner end of the spindle 18, there is rigidly attached a guide member 19 which is positioned at right angles to the spindle and extends laterally upon opposite sides thereof. At its outer end, the spindle 18 has fixed thereto a driving member 20 which may be in the form of a hand crank by means of which the spindle may be rotated in either direction. The contiguous faces of the sleeve 16 and driving member 20 are counterbored to provide a chamber 21 in which is mounted a compression coil spring 22 which surrounds the spindle and bears against the sleeve 16 at one end and the driving member 20 at the other end. The spring 22 forms a frictional driving connection between the member 20 and the sleeve 18 so that the sleeve 18 will be rotating whenever the frictional resistance to the turning movement of the sleeve is less than the frictional resistance offered by the spring 22 to the turning of the spindle within the sleeve.

The machine, as so far described, corresponds substantially with the machine disclosed in my copending application above referred to, the present invention residing in the pipe flanging head mounted on the spindle. The inner end of the spindle 18 is provided with a screw threaded portion projecting beyond the inner end of the sleeve 18 and with a shoulder 24 against which the inner end of the sleeve 18 bears. The guide member 19 has a threaded extension 23 of the spindle, the guide member 19 being screwed tightly against shoulder 24. The member 19 forms a support for an adjustable head 25 which has a groove 26 on its rear face which receives the guide member 19 and flanges 27 which overlie the rear face of the member 19. The head 25 may be slid along the guide member 19 and is provided with means for yieldably holding it in adjusted position thereon. The means for yieldably holding the head in a position to which it is adjusted on the guide member consists of a friction plunger 28 mounted in a bore 29 opening to the bottom of the guide member receiving groove, the plunger 28 being pressed against the guide member 19 by means of a coil spring 30 interposed between the plunger and the bottom of the bore 29. Movement of the head 25 in one direction is limited by the head 31 of a screw 32, screwed into one end of the guide member 19, the head 31 projecting past the front face of the guide member and forming a fixed stop against which the head 25 abuts at one limit of the movement. The movement of the head 25 in the opposite direction is limited by means of an adjustable stop member 33 which has a sliding fit on the guide member 19 and which is secured in adjusted position on the guide member by means of a set screw 34. Mounted on the head 25 at one end is a swaging member 35 which has a shank 36 fitting in a socket formed in the head and secured in place therein by means of a screw 37. The swaging member has a base portion which is transversely elongated and substantially rectangular in form and a swaging point 38 which tapers from the rectangular base portion. The angle of taper gradually decreases toward the point 38 so that the tapering edges have a concave curvature. A transverse curvature along the tapering edges is on centers offset laterally from the axis of the member so that the tapering point of the swaging member as it is forced into a tube has line contact with the walls of the tube. The swaging member 35 is employed to initially spread the walls of a tube at the open end thereof and this member is positioned when in use coaxial with the spindle 18 and is gradually forced while it is being rotated into the open end of the tube. The head 25 is provided at one side of the swaging member 35 with two transverse roller receiving channels 39 and 40 which provide end and intermediate ribs 41 and 42 for a roller receiving shaft 43 which extends through the ribs 41 and 42 and is supported at one end in the swaging member 35. Between the ribs 41 and 42 and in the channel 39, there is mounted a flanging roller 44 which has a concave peripheral groove 45 of a shape corresponding to the outer surface of the flange to be rolled. Between the rib 42 of the swaging member 35, the shaft 43 carries an elongated slightly concave flange engaging roller 46 which engages the flange of the tubing at a point diametrically opposite that engaged by the roller 44.

As shown in the drawing, a piece of seamless tubing 47 may be clamped within the sectional bushing 12 with an end portion sufficient to form the flange projecting beyond the end of the inwardly projecting rib 14 of the bushing. The stop member 33 and screw head 31 are preferably so positioned that when the head 25 is in engagement with the screw head 31, the swaging member 35 is in axial alignment with the spindle 18 and tube 17 and when the head 25 is in engagement with the stop member 33, the flange roller 44 is positioned with its groove 45 offset laterally from the axis of the spindle 18 a distance such that as the spindle is rotated, the groove 45 remains centered with respect to the annular rib 14. However, if either of the stop members should be positioned too far from the axis of the spindle, the head 25 will be automatically centered with respect to the tubing upon engagement of the swaging member or the flanging rollers therewith, the thrust on the swaging member or the flanging roller engaging with the pipe tending to shift the head to a position in which the swaging member or roller are properly centered with respect to the bushing 12 and the friction plunger 28 permitting the necessary movement of the head 25.

At the beginning of the flanging operation, the head 25 is positioned in engagement with the screw head 31 and the swaging member is advanced into engagement with the tubing by turning the hand crank 20. As long as the swaging member is out of engagement with the tube, the sleeve 16 will turn freely and rotate with the spindle 19 due to the friction of the spring 22 to rapidly advance the swaging member into engagement with the tubing. As the swaging member is forced into engagement with the open end of the tube, the frictional resistance of the sleeve 16 to turning movement is increased and the spindle 18 begins to rotate in the sleeve. As the tapering point 38 is rotated within the open end of the tubing, the wall of the tubing at the open end is gradually forced outwardly as shown in Figs. 1 and 3, the feed of the swaging member into the open end of the tubing being effected from time to time by means of the hand wheel 17. Since the swaging member has a relatively sharp point and has line contact with the tube along its opposite tapering edges, it can enter into tubing of extremely small diameter and form an outwardly flaring flange. After the tube has been acted upon by the swaging member as shown in Fig. 3 of the drawings, the head 25 is positioned as shown in Fig. 4 and is fed into engagement with the tubing to roll the flange of the tubing back upon the beaded edge of the projecting rib 14, the flange being pressed against the rib 14 by the roller 45, the roller 46 serving to assist in the bending of the flange at the beginning of the operation. By operating the screw 17, the desired pressure may be exerted upon flanging roller 45 so that the outer surface of the tube flange is rolled into exact conformity with the groove 45 of the flanging roller while the inner surface of the flange conforms to the surface of the beaded edge of the rib 14.

The machine of the present invention is intended for flanging tubing for use with a coupling such as disclosed in my copending application Serial No. 211,719, filed August 9, 1927. This coupling, as shown in Fig. 5 of the drawing, consists of a coupling member 49 provided with a threaded socket having a flange receiving rib 50 in the bottom thereof, which is of the same size and shape as the rib 14 upon which the flange of the tubing is formed, the coupling 49 receiving an end of the tubing with the reversely curved flange 48 thereof hooked over the projecting rib 50. The threaded socket of the coupling member 49 receives the threaded end of a complemental coupling member which is provided at its inner end with an annular concave seat 52 which is machined to conform exactly to the machined outer surface of the flange.

It will be apparent that the present invention provides a very simple and easily adjustable spindle mounting for the pipe flanging devices which permit the flanging operation to be very rapidly performed. It will also be apparent that the swaging member and flanging rollers are so mounted upon the head that they may be quickly and easily removed or replaced and that the head with the flanging devices thereon may be quickly and easily removed from the spindle.

What I claim is:

1. In a tube flanging machine, a spindle, means for rigidly holding the tube with an end thereof adjacent an end of the spindle and in axial alinement therewith, a transverse guide member fixed to the end of said spindle, a head mounted for adjustment longitudinally of said guide member, a tube swaging member fixed to the head, and a tube flanging roller carried by said head, said swaging member and flanging roller being spaced one from the other in a direction lateral with respect to the spindle axis a distance greater than the radius of the tube, said head being adjustable to bring either the swaging member or the flanging roller into tube engaging position.

2. In a tube flanging machine, a spindle, means for rigidly holding the tube with an end thereof adjacent an end of the spindle and in axial alinement therewith, a transverse guide member fixed to the end of said spindle, a head mounted for adjustment longitudinally of said guide member, a tube swaging member mounted on the head adjacent one end thereof, and a tube flanging roller mounted on the head adjacent its opposite end, said flanging roller being positioned clear of the tube when the head is so adjusted that the swaging member is in operative position with respect to the tube.

3. In a tube flanging machine, a spindle, means for rigidly holding the tube with an end thereof adjacent an end of the spindle and in axial alinement therewith, a transverse guide member fixed to the end of said spindle, a head mounted for adjustment longitudinally of said guide member, a tube swaging member mounted on the head adjacent one end thereof, a tube flanging roller mounted on the head adjacent its opposite end, and means for positioning said head with either the swaging member or the flanging roller in tube engaging position.

4. In a tube flanging machine, a spindle, means for rigidly holding the tube with an end thereof adjacent an end of the spindle and in axial alinement therewith, a transverse guide member fixed to the end of said spindle, a head mounted for adjustment longitudinally of said guide member, a tapering swaging member fixed to the head adjacent one end thereof, a flanging roller having a concave flange engaging groove rotatably mounted on the head adjacent the opposite end thereof, and stop members on said guide members co-operating with said head to position the same with either the swaging member or the flanging roller in tube engaging position.

5. In a tube flanging machine, a spindle, means for rigidly holding the tube with an end thereof adjacent an end of the spindle and in axial alinement therewith, a transverse guide member fixed to the end of said spindle, a head mounted for adjustment longitudinally of said guide member, a tapering tube swaging member fixed to the head adjacent one end of the head, a flanging roller mounted on the head adjacent the opposite end thereof, and a flange engaging roller mounted between said swaging member and roller.

6. In a tube flanging machine, a tube centering and clamping bushing, a spindle in axial alinement with said bushing, a guide member fixed to the end of the spindle and extending at right angles thereto, a head slidable on said guide member, spaced tube flanging devices on said head, and a frictional holding device interposed between said head and guide member for yieldably holding the head in adjusted position on said guide member.

7. In a tube flanging machine, a tube centering and clamping bushing, a spindle in axial alinement with said bushing, a guide member fixed to the end of the spindle and extending at right angles thereto, a head slidable on said guide member, a flanging roller carried by said head, and an elongated roller of a diameter slightly less than that of the flanging roller mounted on said head alongside said flanging roller and coaxial therewith.

8. In a tube flanging machine, a frame having a tube centering and clamping bushing, a spindle journaled in the frame in axial alinement with said bushing, a swaging member carried by said spindle, said swaging member having a tube engaging portion longitudinally concave and tapering to a point, means for rotating said spindle, and means for imparting an axial feed movement to said swaging member.

9. In a tube flanging machine, a tube centering and clamping bushing, a spindle in axial alinement with said bushing, and a swaging member carried by said spindle, said swaging member having a transversely elongated base portion and tapering from the opposite ends of the base portion to a point and having longitudinally concave and transversely convex tube engaging edges.

10. In a tube flanging machine, a tube centering and clamping bushing, a spindle in axial alinement with said bushing, and a swaging member carried by said spindle, said swaging member having a transversely elongated base portion and tapering from the opposite ends of the base portion to a point, the opposite edges of the tapering end of said swaging member being longitudinally concave and said edges being transversely curved about centers outwardly of the axis of the member to provide line contact with the wall of the tube in the swaging operation.

In testimony whereof I affix my signature.

CHARLES F. SCHULTIS.